(12) United States Patent
Rico et al.

(10) Patent No.: US 9,567,234 B2
(45) Date of Patent: Feb. 14, 2017

(54) PRECIPITATED CALCIUM CARBONATE, A METHOD FOR ITS MANUFACTURE AND USES THEREOF

(71) Applicant: SOLVAY SA, Brussels (BE)

(72) Inventors: Jean-Luc Rico, Salin de Giraud (FR); Cédric Raboteau, Fos sur Mer (FR); Alexandra Jakob, Arles (FR)

(73) Assignee: Imerys SA, Paris (FR)

( * ) Notice: Subject to any disclaimer, the term of this patent is extended or adjusted under 35 U.S.C. 154(b) by 0 days.

(21) Appl. No.: 14/775,823

(22) PCT Filed: Mar. 17, 2014

(86) PCT No.: PCT/EP2014/055261
§ 371 (c)(1),
(2) Date: Sep. 14, 2015

(87) PCT Pub. No.: WO2014/147010
PCT Pub. Date: Sep. 25, 2014

(65) Prior Publication Data
US 2016/0016810 A1    Jan. 21, 2016

(30) Foreign Application Priority Data
Mar. 18, 2013 (EP) .................................. 13159828

(51) Int. Cl.
| | | |
|---|---|---|
| *C09D 11/322* | (2014.01) | |
| *C09D 11/037* | (2014.01) | |
| *C09C 1/02* | (2006.01) | |
| *C08K 3/26* | (2006.01) | |
| *C01F 11/18* | (2006.01) | |
| *C09J 11/04* | (2006.01) | |
| *D21H 19/38* | (2006.01) | |
| *B82Y 30/00* | (2011.01) | |
| *C09D 7/12* | (2006.01) | |
| *C09D 11/00* | (2014.01) | |
| *D21H 17/67* | (2006.01) | |

(52) U.S. Cl.
CPC .............. *C01F 11/18* (2013.01); *B82Y 30/00* (2013.01); *C01F 11/182* (2013.01); *C08K 3/26* (2013.01); *C09C 1/021* (2013.01); *C09D 7/1216* (2013.01); *C09D 11/00* (2013.01); *C09J 11/04* (2013.01); *D21H 17/675* (2013.01); *C01P 2004/16* (2013.01); *C01P 2004/50* (2013.01); *C01P 2004/61* (2013.01); *C01P 2004/62* (2013.01); *C01P 2004/64* (2013.01); *C08K 2003/265* (2013.01)

(58) Field of Classification Search
CPC ..... C09D 11/322; C09D 11/037; C09C 1/021; C09C 1/022; C09C 1/024; C08K 3/26; C08K 2003/265; C01F 11/182; C01P 2004/16; C01P 2004/50; C01P 2004/64; C09J 11/04; D21H 19/385
USPC .................................. 106/31.9, 464; 423/430
See application file for complete search history.

(56) References Cited

U.S. PATENT DOCUMENTS

| | | | |
|---|---|---|---|
| 4,824,654 A | 4/1989 | Ota | |
| 6,743,286 B2 * | 6/2004 | Wen | ........................ C09C 1/021 106/464 |
| 2003/0213937 A1 | 11/2003 | Yaniv | |
| 2004/0166047 A1 | 8/2004 | Vogels et al. | |
| 2009/0082508 A1 * | 3/2009 | Vogels | ................... C01F 11/182 423/432 |
| 2010/0163196 A1 * | 7/2010 | Dougherty | .............. D21H 11/08 162/135 |
| 2012/0097069 A1 * | 4/2012 | Gane | .................... D21H 19/385 106/286.6 |
| 2014/0242387 A1 * | 8/2014 | Jakob | ...................... C09C 1/021 423/430 |

FOREIGN PATENT DOCUMENTS

| | | |
|---|---|---|
| EP | 0634463 A2 | 1/1995 |
| EP | 2292701 A1 | 3/2011 |
| KR | 20040087050 A | 10/2004 |
| WO | 2013050495 A1 | 4/2013 |

OTHER PUBLICATIONS

International Preliminary Report of Patentability for PCT/EP 2014/055261 (Written Opinion) dated Sep. 22, 2015; 8 pages.*
Excerpt of M. K. Choi, J. S. Cho, S. M. Joo, J. K. Park, J. W. Ahn, H. Kim, "Effect of Several Factors on the Synthesis of Calcium Hydroxide Prepared by Spray Drying Method Using Limestone", Materials Science Forum, vol. 544-545, pp. 733-736, May 2007.
"Carmona J G et al: ""The mechanism of precipitation of chain-like calcite""", Journal of Crystal Growth, Elsevier,Amsterdam, NL, vol. 262, No. 1-4, Feb. 15, 2004 (Feb. 15, 2004), pp. 479-489".

* cited by examiner

*Primary Examiner* — Helene Klemanski
(74) *Attorney, Agent, or Firm* — Finnegan, Henderson, Farabow, Garrett & Dunner LLP

(57) ABSTRACT

Dry precipitated calcium carbonate and a slurry of precipitated calcium carbonate ("PCC") particles at least partially in the form elongated entities, especially of nanofibers or nanochain like agglomerates constituted by at least two interconnected primary particles, and preferably, with a content of scalenohedron particles, is provided having opacifying properties. The slurry may be produced on site of its use and, due to its high concentration of $CaCO_3$, may be applied directly after its manufacture.

18 Claims, No Drawings

PRECIPITATED CALCIUM CARBONATE, A METHOD FOR ITS MANUFACTURE AND USES THEREOF

This application is a U.S. national stage entry under 35 U.S.C. §371 of International Application No. PCT/EP2014/055261 filed Mar. 17, 2014, which claims priority to European application No. 13159828.6 filed 18 Mar. 2013. The entire contents of these applications are explicitly incorporated herein by this reference. The present invention relates to precipitated calcium carbonate in dry form or in the form of a slurry, a method for its manufacture and uses thereof, especially for its use as an opacifier, notably in the manufacture of paints, plastics or paper. The present invention also relates to a specific method to produce paints, papers and paper coatings, and a specific method to produce plastisols and sealants.

The use of precipitated calcium carbonate particles as a filler, for instance in papers and paints, is known in the art, including the use of precipitated calcium carbonate particles of specific shapes. For instance, U.S. Pat. No. 4,824,654 discloses a process of producing needle-shaped calcium carbonate particles which are useful as a filler or a reinforcing material of various materials such as rubbers, papers, plastics and paints. According to said patent, the particles have an average length of 5-100 μm and an average diameter of 0.2-5 μm and may confer high smoothness and gloss to the material.

Another example is given by European patent application EP-A-2 292 701 which discloses a process for preparing an aqueous suspension of dispersed calcium carbonate, wherein the resulting coating of said suspension provides opaque properties or has a specific light scattering coefficient S, such suspension comprising dispersed calcium carbonate and an alkali carbonate and/or alkali hydrogen carbonate and being especially suitable in the field of paper coatings, paper mass fillings, paints and plastic coatings. Dry precipitated calcium carbonate can also be used for the manufacture of plastisols and sealants.

When high opacity is sought, such as in paints which dry to give matt or silk (i.e. mid-sheen) finishes, zinc sulphide and, most often, titanium dioxide are used as opacifiers, as disclosed in EP0634463.

However, titanium dioxide has the disadvantage to be expensive. Furthermore, its typical industrial manufacturing processes are not environmentally friendly. There is thus a need for opacifiers having good opacifying properties but with a limited cost.

The purpose of the present invention is, i.a., to provide an opacifier showing excellent opacifying properties while being of reasonable cost compared to known high quality opacifiers such as titanium dioxide, and being easily applicable.

According to one aspect, the invention relates to a precipitated calcium carbonate comprising particles which are at least partially in the form of nano fibers or nanochain like agglomerates constituted by at least two interconnected primary particles, and which precipitated calcium carbonate optionally comprises scalenohedron particles.

According to another aspect, the present invention relates to a slurry of precipitated calcium carbonate ("PCC)") particles. The slurry is preferably an aqueous slurry.

The precipitated calcium carbonate and the respective slurry are now described in detail.

The slurry comprises precipitated calcium carbonate preferably in an amount of 20 to 60% by weight.

Preferably, the content of precipitated calcium carbonate is equal to or greater than 26% by weight, more preferably, equal to or greater than 27% by weight, and still more preferably, equal to or greater than 28% by weight. Especially preferably, the content of precipitated calcium carbonate is equal to or greater than 30% by weight. Preferably, the content of precipitated calcium carbonate is equal to or lower than 50% by weight. A preferred range of the content of precipitated calcium carbonate is from equal to or greater than 28% by weight to equal to or lower than 45% by weight.

The primary particles of the PCC are rhomboids and scalenohedrons. While the rhomboids form elongated entities namely nanochains or nanofibers, by aggregation, the scalenohedrons are elongated entities per se.

Thus, the structure of the PCC particles is constituted at least partially by a PCC entity (particles or aggregates) that show an elongated shape; i.e. they have an aspect ratio of >1. A specific feature of the elongated entities is that they combine together to form microshells.

Thus, the slurry comprises elongated entities of PCC particles. The term "elongated entities" denotes especially nanofibers and nanochainlike aggregates and scalenohedrons. Nanofibers or nanochainlike aggregates and scalenohedrons form microshells.

The slurry comprises particles which are in the form of nanofibers or nanochain like agglomerates constituted by at least two interconnected primary particles which often are rhomboids. These particles are predominant particles in slurries having a content of precipitated calcium carbonate in the lower end of the preferred range.

Slurries with a relatively high content of precipitated calcium carbonate, for example, in slurries containing equal to or more than 28% by weight, and especially in slurries containing equal to or more than 30% by weight of precipitated calcium carbonate, also comprise precipitated calcium carbonate in the form of scalenohedrons. The scalenohedrons also form microshells. The higher the concentration of precipitated calcium carbonate in the slurry the higher the content of scalenohedrons substituting the precipitated calcium carbonate in the form of nanofibers.

Indeed, it has been surprisingly found that said calcium carbonate particles exhibit improved opacifying properties while keeping a mat finish, allowing the preparation of compositions showing an improved opacity of the composition itself and/or of the product obtained after curing or drying of said composition, compared to the use of other calcium carbonate grades. It is therefore possible to prepare compositions having an improved opacity with a matt finish. It is also possible to replace at least part of high quality opacifiers such as titanium dioxide, without decreasing the opacity of the composition and/or of the product obtained after curing or drying of said composition, which is of great economical interest for high performance paints. In particular in paints, the use of PCC according to the present invention might substitute up to 60 wt % of $TiO_2$ content without affecting opacity of the resulting composition.

In the present invention, the term "opacifier" intends to denote a substance that, when added to a material, renders it opaque or at least increases its opacity. Opacity is linked to the light scattering coefficient S and the light absorption coefficient K of the material, a higher S and/or a lower K corresponding to a higher opacity. Opacity is especially important in matt paints and papers.

The term "paint" intends to denote any liquid, liquefiable, or mastic composition, more particularly liquid or liquefiable composition, comprising pigments, which after application to a substrate in a thin layer is converted to an opaque solid film. Such a solid film is most commonly used to protect, to color or to provide texture to objects, for instance, walls.

The term "particle" is understood to mean a physically and chemically autonomous entity. The term "primary particle" refers to the elementary particles of precipitated calcium carbonate. The predominant primary particles are rhomboids and scalenohedrons as explained above.

In the terms "nanofibers" and "nanochain like agglomerate", the prefix "nano" means that the nanofibers or nanochain like agglomerates have a characteristic dimension at the nanoscale, preferably, a characteristic dimension which is, on average, less than 500 nm, more preferably, a characteristic dimension which is, on average, less than 250 nm, and in particular, a characteristic dimension which is, on average, less than 200 nm. In nanofibers or nanochain like agglomerates, said characteristic dimension is the average diameter.

The term "nanofiber" intends to denote an elongated entity having a characteristic dimension, i.e. average diameter, less than 500 nm, preferably an average diameter less than 250 nm, and in particular, an average diameter less than 200 nm. The term "nanochain like agglomerate" intends to denote an elongated entity having a characteristic dimension, i.e. average diameter, less than 500 nm, preferably an average diameter less than 250 nm, and in particular, less than 200 nm. Nano fibers mainly differ from nanochain like agglomerates in that the individual primary particles cannot be distinguished anymore and form nanofibers which appear to be homogeneous and even, for example on electron microscopy photographs, whatever the magnification. In nanochain like agglomerates, the primary particles retain their individuality and remain visible, for example on electron microscopy. Nanochain like agglomerates can also be named "nanorosaries".

The term "scalenohedron" refers to elongated PCC primary particles which present a primary particle size in a range of from 80 to 300 nm, and preferably of from 100 to 200 nm. Such primary particle size is representative of the smaller dimension of the particle.

An essential feature of the present invention resides in the fact that at least part of the precipitated calcium carbonate particles are in the form of an elongated entity. As already described above, the elongated entities are often of the type of nanofibers or nanochain like agglomerates, such nanofibers or nanochain like agglomerates being constituted by at least two interconnected primary particles and therefore having an elongated morphology; or they are scalenohedral elementary particles also having an elongated morphology.

In the present invention, precipitated calcium carbonate particles are preferably present in the form of elongated entities in an amount of at least 1% by weight of the calcium carbonate particles. Often, precipitated calcium carbonate particles are present in the form of elongated entities in an amount of at least 8% by weight of the calcium carbonate particles. In the present invention, precipitated calcium carbonate particles are typically present in the form of elongated entities in an amount of at least 10% by weight of the calcium carbonate particles, more preferably in an amount of at least 15% by weight of the calcium carbonate. The amount of elongated entities, be they nanofibers or nanochain like agglomerates, or scalenohedrons, has been evaluated relying on SEM (Scanning Electron Microscopy) or TEM (Transmission Electron Microscopy) image analysis. The obtained values correspond to the number of elementary particles that belongs to the nanofibers in respect to the total number of elementary nanoparticles, the measurement being performed in areas of acceptable resolution. It is preferred to determine the amount in a homogenized sample.

According to the invention, the primary particles are preferably in the form of calcite crystals. The primary particles may present in a huge variety of shapes, the most common being rhombohedral and scalenohedral morphology. The presence of scalenohedral particles provides certain advantageous properties as outlined below.

In the present invention, the scalohedron particles are elongated elementary particles. As to the nano fibers or nanochain like agglomerates, without wishing to be committed to a theoretical explanation, it is believed that the nanofibers or the nanochain like agglomerates result from the end-to-end juxtaposition of primary particles that are approximately spherical. Thus, contrary to the scalenohedron particles, the nanofibers or nanochain like agglomerates are secondary particles, formed by agglomerisation of primary particles. Therefore, the average primary particle size (dp) is close to the smaller dimension of the scalenohedron elementary particles and to the average diameter of the nano fibers or nanochain like agglomerates. Advantageously, the average primary particle size (dp) differs from the smaller dimension of the scalenohedron and from the average diameter of the nano fibers or of the nanochain like agglomerates by less than 50%, preferably by less than 25%, more preferably by less than 10%. These nano fibers or nanochain like agglomerates are thus secondary particles or agglomerates of primary particles. Said nano fibers or nanochain like agglomerates can optionally be further combined in any way. For instance, the nano fibers or nanochain like agglomerates may be interwoven with respect to one another in a disorganized way. The nanofibers or nanochain like agglomerates can also be combined parallel to one another and form "faggots" that may be composed of several tens or hundreds of similar nanofibers or nanochain like agglomerates. The nanofibers or nanochain like agglomerates can also be combined to form microshells. Microshells may be composed of tens to hundreds of nanofibers or nanochain like agglomerates. In such a case, the nanofibers or nanochain like agglomerates are usually visible at least on the inner part of the microshell like agglomerates. In the present invention, the nano fibers or nanochain like agglomerates are most of the time combined to form microshells.

The scalenohedron elementary particles also form microshells.

The average diameter of the nano fibers or nanochain like agglomerates of the present invention can thus be estimated on the basis of the average primary particle size of the particles constituting the same (dp). As an approximation, it is considered that the average diameter of the nanofibers or nanochain like agglomerates is equal to the average primary particles size (dp). Said primary particle size (dp), and the particle size of the scalenohedron elementary particles, is in general equal to or higher than 1 nm, in particular equal to or higher than 10 nm, more particularly equal to or higher than 20 nm, values equal to or higher than 30 nm giving good results. An elementary particle size (dp) (as to the scalenohedron particles) and primary particle size (dp) (as to the primary particles forming the nano fibers or nanochain like agglomerates) of equal to or greater than 50 nm is particularly preferred. The primary and elementary particle size (dp) is usually equal to or lower than 500 nm, preferably, equal to or lower than 250 nm, and in particular, equal to or lower than 200 nm. Suitable ranges for the primary and elementary particle size (dp) of the scalenohedrons and nano fibers or nanochain like agglomerates are usually from 10 to 500 nm, preferably 40 to 250 nm, more preferably, 50 to 200 nm. The primary particle size (dp) is typically measured by permeability. The average diameter of the scalenohedron particles, nanofibers or nanochain like agglomerates of the present invention can also be estimated relying on SEM (Scanning Electron Microscopy) or TEM (Transmission Electron Microscopy) observations. For instance, the diameter of scalenohedron particles and of nanofibers or nanochains can be determined by image analysis of pictures taken by scanning electron microscopy (SEM) or transmission electron microscopy (TEM), measuring directly the diameter of particles or measuring the breadth of rectangles comprising the particles, preferably measuring directly the diameter. The average diameter is the arithmetic mean of the individual diameters of the nanoparticles constituting a given population of nanoparticles. Said average diameter is in general equal to or higher than 1 nm, in particular equal to or higher than 10 nm, more particularly equal to or higher than 20 nm, values equal to or higher than 30 nm giving good results; in particular, it is equal to or higher than 40 nm. The average diameter is usually equal to or lower than 500 nm, preferably, equal to or lower than 250 nm, and more preferably, equal to or lower than 200 nm. Suitable ranges for the average diameter of the nano fibers or nanochain like agglomerates are usually from 10 to 500 nm, preferably, from 40 to 250 nm, more preferably, from 50 to 200 nm.

The average length of the scalenohedron particles, nanofibers or nanochain like agglomerates can be estimated relying on SEM (Scanning Electron Microscopy) or TEM (Transmission Electron Microscopy) observations. For instance, the length of scalenohedron particles and nanofibers or nanochain can be determined by image analysis of pictures taken by scanning electron microscopy (SEM) or transmission electron microscopy (TEM), measuring directly the length of particles or measuring the length of rectangles comprising the particles, preferably measuring directly the length. The average length is the arithmetic mean of the individual lengths of the particles, e.g., nanoparticles constituting a given population of nanoparticles. The nano fibers or nanochain like agglomerates typically result from end-to-end juxtaposition of from 2 to 20 primary calcium carbonate particles, preferably 2 to 10, most preferably 2 to 8. The average length of the nanofibers or nanochain like agglomerates typically ranges from 20 to 2000 nm, preferably from 20 to 1000 nm, more preferably, from 40 to 1000 nm, and most preferably from 80 to 1000 nm.

In the present invention, the nanofibers or nanochain like agglomerates, and the scalenohedrons, respectively, may be at least partially combined in an organized or random way to form aggregates. In a specific embodiment, these nano fibers or nanochains may at least partially combine themselves to form microshell-like aggregates in which the nanofibers are at least partially, preferably mostly, visible on the inner part of the shell. Likewise, the scalenohedron particles may at least partially combine themselves to form microshell-like aggregates. The median size of these aggregates may be evaluated on the basis of the aggregate median size (D50) or Stoke's diameter, determined by sedimentation analysis (see Examples). Said aggregate median size (D50) is generally equal to or higher than 100 nm, especially equal to or higher than 200 nm, more specifically equal to or higher than 400 nm, for instance equal to or higher than 600 nm. The aggregate median size of the calcium carbonate particles of the present invention is typically equal to or lower than 5 μm, with preference equal to or lower than 4 μm, with higher preference equal to or lower than 3 μm, for example equal to or lower than 2.5 μm. Very suitable ranges for the aggregate median size of the aggregates are from 0.1 to 5 μm, preferably from 0.2 to 4 μm, more preferably from 0.4 to 3 μm, most preferably from 0.8 to 2.5 μm.

In the present invention, it is advisable to limit the amount of aggregates having a size above 10 μm. The amount of agglomerates having a size above 10 μm is preferably less than 5% by weight of the calcium carbonate, typically less than 2% by weight, especially less than 1% by weight. It has indeed been found that aggregates with a size above 10 μm can have a detrimental effect on the compositions comprising the same, especially resulting in a decrease of the composition opacity.

The scalenohedron particles, the nanofibers or the nanochain like agglomerates of the present invention have typically an aspect ratio strictly higher than 1.0. The aspect ratio is defined as the ratio of a "higher dimension" (L) of a particle, typically its length, on a "smaller dimension" of the particle, usually its diameter. The aspect ratio of the particles of the present invention is usually equal to or higher than 2, preferably equal to or higher than 3, for instance equal to or higher than 4. The aspect ratio of the scalenohedron particles, the nanofibers or the nanochain like agglomerates of the present invention is often equal to or lower than 50, more often equal to or lower than 20, values equal to or lower than 15 or equal to or lower than 10 giving good results. The aspect ratio is generally determined by image analysis of pictures taken by scanning electron microscopy (SEM) or transmission electron microscopy (TEM), these techniques being used to determine the lengths and diameters of the scalenohedron particles, the nano fibers or the nanochain like agglomerates. In the present invention, the aspect ratio of a population of nano fibers or the nanochain like agglomerates is the mean aspect ratio of a population of nanofibers or the nanochain like agglomerates, i.e. the arithmetic mean of the individual aspect ratios of the nanofibers or the nanochain like agglomerates constituting a given population of nano fibers or the nanochain like agglomerates. The aspect ratio of a population of scalenohedron particles is the mean aspect ratio of a population of scalenohedron particles, i.e. the arithmetic mean of the individual aspect ratios of scalenohedron particles constituting a given population of scalenohedron particles. Preferred suitable ranges for the aspect ratio varies from 2 to 50, especially from 2 to 20, more particularly 2 to 8.

In order to conduct image analysis of pictures taken by SEM or TEM, magnification should be chosen in a reasonable way, such that the particles would be reasonably defined and present in a sufficient number. In such conditions, the analysis of a reasonable number of pictures, for instance around 10 pictures, should allow accurate characterization of the particles. If magnification is too low, the number of particles would be too high and the resolution too low. If the magnification is too high, with for instance less than 10 particles per picture, the number of pictures to be analyzed would be too high and several hundreds of pictures should be analyzed to give accurate measurements. The method must therefore be chosen to provide a good dispersion degree of the nanoparticles into the sample.

Such precipitated calcium carbonate particles, in the form of scalenohedron nanofibers or nanochain like agglomerates, have generally an aggregation ratio, defined as the ratio of the aggregate median size (D50) on the average diameter (dp), higher than 1, preferably equal to or higher than 2, more preferably equal to or higher than 5, most preferably equal to or higher than 10, in particular equal to or higher than 20. The aggregation ratio of the particles is usually equal to or lower than 300, often equal to or lower than 100, most often equal to or lower than 50. An aggregation ratio from 5 to 300 is especially suitable, more particularly from 10 to 100, most particularly from 20 to 50.

Calcium carbonate particles in the present invention generally have a $S_{BET}$ specific surface area higher than 5 m$^2$/g, especially from 10 to 60 m$^2$/g, for example, from 24 to 36 m$^2$/g. $S_{BET}$ specific surface area is measured by the BET technique described in Standard ISO 9277.

In a preferred embodiment, the precipitated calcium carbonate of the present invention comprises a crystallization controller. The expression "crystallization controller" is understood within the broad functional meaning. The function of the crystallization controller is to modify the interaction between the solid phase, liquid phase and gas phase present, during the nucleation and/or the growth of the crystalline seeds of calcium carbonate, so as to control the crystalline morphology obtained and thus the appearance of the resulting calcium carbonate particles. Crystallization controllers also play an important role to control the size of the precipitated calcium carbonate particles and may act as growth promoters or growth inhibitors.

In an especially preferred embodiment, the crystallization controller is selected from the group consisting of polyacrylic acid, salts thereof and mixtures thereof. Advantageously, the crystallization controller is selected from partially neutralized polyacrylic acid, especially polyacrylic acid wherein part of the acid groups has been neutralized with sodium ions. For instance, around 70% of the acid groups are neutralized, leading to a partially neutralized compound having a pH around 5-6. In another aspect, about 100% of the acid groups are neutralized, leading to a neutralized compound having a pH of about 6.5 to about 10.

In the present invention, the crystallization controller is usually present in an amount equal to or higher than from 0.1 wt % by weight of calcium carbonate, preferably equal to or higher than 0.2 wt %, more preferably equal to or higher than 0.25 wt %, for example equal to or higher than 0.5 wt %. The crystallization controller amount is typically equal to or lower than 10 wt % by weight of calcium carbonate, especially equal to or lower than 4 wt %, particularly equal to or lower than 2.5 wt %, more particularly lower than 2 wt %, values equal to or lower than 1 wt % being also suitable. Ranges of 0.1 to 10 wt % by weight of calcium carbonate are often used, more often from 0.2 to 4 wt %, for instance from 0.25 to 2.5 wt % or even from 0.25 to 1 wt %.

In the present invention, the crystallization controller has typically an average molecular weight from 500 to 15000 g/mol, often from 700 to 5000 g/mol, more often from 800 to 4000 g/mol, most often from 1000 to 3500 g/mol. The crystallization controller is usually added to the reaction medium prior to or during the calcium carbonate precipitation, typically as an aqueous solution.

The precipitated calcium carbonate slurry of the present invention has the advantage that it can be used as such for the intended use, for example as opacifier in paint, plastics or paper and related materials; or any application in which it is targeted to substitute TiO$_2$ for its opacifying properties. This is possible because of the high concentration in which the precipitated calcium carbonate is present in the slurry. According to precipitated calcium carbonate of the state of the art, only slurries with much lower concentration of precipitated calcium carbonate with desired opacifying properties were produced.

According to an alternative, the slurry of the invention can be dried to obtain dried precipitated calcium carbonate. The dried calcium carbonate still provides the desired opacifying properties described above. The dried PCC is especially suitable for application in plastisols and sealants or in polymers, e.g. in polyethylene and polypropylene.

The dried precipitated calcium carbonate, obtainable or obtained from the slurry described above, is another aspect of the present invention. It contains elongated entities as described above. Preferably, the dried precipitated carbonate contains scalenohedron elementary particles. The dried precipitated calcium carbonate preferably comprises microshells formed from nanofibers or nanochain like aggregates, and from scalenohedron elementary particles, respectively. The dimensions of the primary particles (rhomboids) and the scalenohedron particles are described in detail above. Preferably, the dried precipitated calcium carbonate contains scalenohedron particles and microshells formed from the scalenohedron particles.

The precipitated calcium carbonate particles of the present invention are typically prepared by precipitation in the presence of a crystallization controller preferably selected from polyacrylic acid, salts thereof and mixtures thereof.

In some cases, it may be advantageous to further coat dried particles with a layer of organic matter such as saturated or unsaturated fatty acids having 2 to 22 carbon atoms, fatty acids with chains from 16 to 18 carbon atoms being preferred. Such a coating of the particles is especially suitable for their subsequent use in plastics. In paint and paper applications, the particles are usually not coated with a layer of organic matter.

Another aspect of the present invention is to provide a process for the manufacture of the slurry. The process for the manufacture of the slurry of precipitated calcium carbonate of the present invention is usually performed in water.

The process comprises
a) A step of providing CaO, which is reacted with water to form Ca(OH)$_2$, preferably to form dry Ca(OH)$_2$
a1) An optional step wherein the Ca(OH)$_2$ of step a) is dried to provide dried Ca(OH)$_2$;
b) A step wherein the dry Ca(OH)$_2$ of step a) or the dried Ca(OH)$_2$ of step a1) is contacted with water to form a slurry; and
c) A step wherein the slurry of Ca(OH)$_2$ from step b) is carbonated with CO$_2$.

Step a) is preferably performed at a temperature of from 10 to 95° C., and preferably, at a temperature of from 20 to 60° C. Preferably, the amount of water is selected such that directly in step a), a dry Ca(OH)$_2$ is formed and step a1) is not necessary. Thus, a preferred process for the manufacture of the slurry of precipitated calcium carbonate comprises
a) A step of providing CaO, which is reacted with water to form dry Ca(OH)$_2$
b) A step wherein the dry Ca(OH)$_2$ of step a) is contacted with water to form a slurry; and
c) A step wherein the slurry of Ca(OH)$_2$ from step b) is carbonated with CO$_2$.

The dry or dried Ca(OH)$_2$ may be milled before contacting it with water to form a slurry.

In step b), the reaction temperature is preferably kept in a range of from 10 to 95° C., preferably, in a range of from 10 to 60° C. Often, the concentration of calcium hydroxide in the formed milk of lime is in a range of from 10 to 45% by weight, and more preferably, in a range of from 15 to 35% by weight. The concentration of calcium hydroxide in the milk of lime formed in step b) is in particular selected such that after carbonisation, the CaCO$_3$ concentration is preferably equal to or greater than 27% by weight as indicated above. Here, it is preferred that the concentration of $Ca(OH)_2$ is equal to or greater than 19% by weight.

The viscosity of the milk of lime formed in step b) is preferably in a range of from 20 to 4000 cP, more preferably, in a range of from 20 to 1000 cP. The viscosity refers to the Brookfield viscosity and may be measured with a rotative viscosimeter at 50 rpm.

In the preparation process, the milk of lime formed in step c) is carbonated by reaction of the latter with carbon dioxide gas. Carbon dioxide gas having a concentration of carbon dioxide varying from 3 to 100% could be used with success. However, it is preferable to use carbon dioxide gas for which the concentration is from 10 to 60% by volume, especially from 10 to 40% by volume, and in particular, 25 to 40% by volume, carbon dioxide gas being diluted with air or other inert gas.

Some additives might also be further added during the carbonation step, such as isoascorbic acid, to reduce yellowness of the resulting calcium carbonate particles.

The advantage of the process of the invention is that a slurry is obtainable which has a very high content of precipitated calcium carbonate which still has the desired opacifying effect. Of course, in the 1-step carbonization processes of the state of the art, one could react CaO with a respectively adapted amount of water to obtain a slurry of milk of lime with a relatively high content of $Ca(OH)_2$ which then could be carbonated with $CO_2$. The main disadvantage is that control of carbonation is decreased due to bad $CO_2$ absorption in the very viscous milk of lime. Therefore, carbonation is not repeatable from one batch to the other, resulting in fluctuations of PCC properties such as elementary particle size and size of the aggregates which may influence the opacity. It is assumed by the inventors that this is due to a too high viscosity in the reaction mixture during carbonization. It must be considered as very surprising that the simple step of dehydrating and subsequent formation of a slurry of the formed milk of lime provides a slurry of $CaCO_3$ which is highly concentrated and nevertheless has the desired effect.

Said preparation process preferably is performed such that a precipitated calcium carbonate slurry comprising equal to or more than 27% by weight of PCC by weight of slurry. Preferably, the amount is still higher as indicated above, up to equal to or less than 60% by weight. A very preferred range is from 28 to 45% by weight. As described below, the slurry may be applied as such.

If it is desired to provide dry PCC, the precipitated calcium carbonate particles might be filtered, for example through a planar filter, and dried, for instance in an oven, by spraying into a stream of hot air (spray drying), or by the action of radiation such as infrared radiation (epiradiator), preferably in an oven or by the action of radiation such as infrared radiation. The resulting particles might then be further milled, for instance in a pin mill apparatus with a milling intensity ranging from 10 000 rpm to 20 000 rpm. The dried PCC is very well suited, for example, to be used in the manufacture of plastisols, sealants and polymers. Preferably, the slurry containing the PCC is applied as such. The advantage, of course, is that it can be used immediately after its manufacture, without drying and rehydration. Another advantage is that due to the high concentration of PCC in the slurry, the size of carbonators used in the precipitation process can be reduced. This advantage is especially useful when precipitation is performed on site as described below.

The particles obtained in the process mainly formed from calcite. The calcite crystals, if being pseudo-spherical or cubic, are randomly aggregated and form nano fibers which in turn, may form microshells; if being scalenohedrons, they may be randomly aggregated or form microshells.

The PCC slurry according to the present invention is especially suitable in paints, paper mass fillings, paper coatings and plastic coatings, preferably in paints, paper mass fillings and paper coatings. The slurry is especially advantageous in aqueous paints, particularly in matt or silk (i.e. mid-sheen) aqueous paints, more particularly in matte aqueous paints such as acrylic paints or "latex house paints", where high opacity is sought with a mat finish. The use of the present invention might also be of specific interest in paper fillings and paper coatings such as in cigarette papers or rolling papers.

The slurry of the present invention is therefore typically applied to improve opacity of paints, papers, paper coatings or plastic coatings, preferably of paints, papers and paper coatings, more preferably of paints. The slurry can also be applied to decrease the cost of a composition without decreasing its opacity and/or the opacity of the product obtained after curing or drying of said composition.

In a still further embodiment, the present invention relates to the use of the slurry as a filler, preferably as an opacifier. This opacifier may be used to substitute $TiO_2$ (in any applications where the latter is used as an opacifier.

Advantageously, the precipitated calcium carbonate particles in the slurry are used as an opacifier in paint, plastic ink, or paper industry, especially in paints, paper mass fillings and paper coatings, more particularly in aqueous paints such as in matte or silk (i.e. mid-sheen) aqueous paints, most particularly in matte aqueous paints such as acrylic paints or "latex house paints", where high opacity is sought with a mat finish. The slurry might also be of interest for use in paper fillings and paper coatings such as in cigarette papers or rolling papers. In a particular further embodiment, the specific precipitated calcium carbonate particles in the slurry are used as a functional additive. Such functional additive can bring some additional properties to the target object, being such as adequate rheology characteristics for different applications. Advantageously, such specific precipitated calcium carbonate particles after drying are used as a functional additive in plastisol, sealant or ink.

While above, the use of the slurry containing dispersed calcium carbonate is described, the slurry may as well be dewatered, and the resulting dried and optionally milled calcium carbonate may be used as describe here before, especially in plastisols, sealants and polymers. Other applications may include cements, lubricants and healthcare.

The precipitated calcium carbonate can be used to substitute $TiO_2$. It can be, for example, applied in polyethylene plastics.

Another aspect of the present invention is to provide a process wherein formed slurry is used "on site". The term "on site" means that the apparatus for the formation of the PCC slurry is located at a close distance to the apparatus wherein articles like paint, plastics or paper and related materials are produced. The distance between the apparatus for forming the PCC slurry and the apparatus wherein it is applied is preferably equal to or shorter than 500 m, more preferably, equal to or shorter than 100 m. The distance can even be shorter, e.g. equal to or lower than 50 m, and it is possible that the apparatus for PCC slurry generation is located in close proximity of the apparatus wherein it is applied, e.g. in a distance equal to or shorter than 10 m. Especially preferably, the apparatus for the PCC slurry manufacture is in fluid connection to the apparatus in which it is applied. Thus, by a fluid connection, it is avoided to transport the PCC in tanks or bottles; it is also avoided to provide a drying step to transport dry PCC.

The slurry of the invention is especially suited for a production on site because due to the higher PCC concentration, carbonators with reduced size may be applied. The transport costs are drastically reduced because no transport on the road or via rail is necessary. The customer gets a ready-made slurry with reliable properties.

Should the disclosure of any patents, patent applications, and publications which are incorporated herein by reference conflict with the description of the present application to the extent that it might render a term unclear, the present description shall take precedence.

The present invention is further illustrated below without limiting the scope thereto.

EXAMPLES

Precipitated Calcium Carbonate (PCC) Particles Characterization Average Primary Particle Size (dp) (Measured on the Dried Slurry)

dp is determined by permeability measured according to a method derived from BS 4359-2. The basis of this method is the measurement of the air permeability of a pellet, which is analogous to the "Blaine" or the "Lea & Nurse method". The calculation of the dp derives from the Carman & Malherbe formula:

$$q \times L = \frac{1.05\varepsilon^2}{(1-\varepsilon)^2} ds^2 + \frac{2.88\varepsilon^2}{1-\varepsilon} ds$$

with $$\varepsilon = 1 - \frac{W}{A \times L \times D}$$

It can be shown that the mean particle diameter ds which is determined according to the Carman & Malherbe formula is not absolutely independent from the porosity of the pellet. Consequently, a correction is brought considering the reference porosity $\varepsilon=0.45$ and the dp was calculated according to the formula:

Definitions $dp = ds \times e^{-3.2(\varepsilon - 0.45)}$ and unities are as follows:
q=volumetric rate of air flow passed through the PCC pellet ($cm^3/g$),
$\varepsilon$=porosity,
W=weight of PCC,
L=thickness of the pellet,
D=density of PCC ($g/cm^3$),
A=area of the cross section of the pellet ($cm^2$),
ds=mean particle diameter according to Carman & Malherbe (µm), and
dp=mean particle diameter according to Solvay (µm).

Average Diameter and Average Length (is Measured on the Dried Slurry)

Average diameter and average length of the scalenohedron particles, nanofibers or nanochain like agglomerates is estimated relying on scanning electron microscope (SEM) observations. The samples are prepared from a metallized powder and observed with a Hitachi S-4800 SEM. The samples are directly placed on a graphite tape, then metallized with platinum for 1 minute under a vacuum of $10^{-1}$ Pa with a beam intensity of 6 mA.

Aggregate Median Size (D50 or Stoke's Diameter)

D50 can be measured on the slurry or on dried particles. It is measured on the basis of French standard ISO 13317-3, "Particle size sedimentation analysis of a powder by variable height gravity in a liquid. Method by X-ray absorption measurement", in which the general method and the apparatus (Sedigraph) are described. Since the preparation of the sample influencing the results of the measurement, such preparation method is described below.

Preparation of the samples: 2.7 g of precipitated calcium carbonate are introduced into 50 ml of Na-hexametaphosphate (2 g/L) and the solution is treated by magnetical stirring and ultrasound.

For the measurements, a Sedigraph 5100® equipped with an automatic sampler Mastertech 51® from Micromeritics was used. The measurement was performed between 0.1 µm (starting diameter) and 100 µm (ending diameter).

General Procedure for the Preparation of Aqueous Emulsion Paints

Optical Properties

Paint test cards are prepared using an automatic coater (Erichsen, Type 509 MC) to coat contrast test cards (Leneta Form 09) with the paint samples to be tested, at a feed rate of 7.5 mm/s (layer of 200 µm). Films are then left to dry before measurements.

Optical properties are measured using a spectrophotometer (DataColor DC 600 and Datacolor QCX software), calibrated with a black standard (luminance factor 0.1%) and a white calibration standard (serial No. 12077) before each measuring cycle. This provides the following results: brightness (Y, DIN 53163), yellowness (DIN 6167) and opacity. Opacity corresponds to the contrast ratio which is the ratio $Y_{black}/Y_{white} \times 100$, where $Y_{black}$ and $Y_{white}$ are the brightness on respective black and white parts of the contrast test cards.

Gloss is measured with a gloss measuring equipment such as micro-TRI-gloss from Byk-Gardner. Same cards are used as those used to measure the optical properties. The gloss is measured at an angle of 85° for at least three different positions on the sample surface. Gloss values are given in GU (Gloss Unit).

General Procedure to Produce Paint Formulations: Test to Substitute 40% $TiO_2$

The following formulations are prepared:
Formulation 1: reference without PCC from the invention.
Formulation 2: Substitution of 40% $TiO_2$ using a dry PCC prepared from a 19 wt. % PCC slurry prepared according to the present invention.
Formulation 3: Substitution of 40% $TiO_2$ using a 19 wt. % PCC slurry prepared according to the present invention.
Formulation 4: Substitution of 40% $TiO_2$ using a dry PCC prepared from a 30 wt. % PCC slurry prepared according to the present invention.
Formulation 5: Substitution of 40% $TiO_2$ using a 30 wt. % PCC slurry prepared according to the present invention.

| | Formulation 1 (wt %) | Formulation 2 (wt %) | Formulation 3 (wt %) | Formulation 4 (wt %) | Formulation 5 (wt %) |
|---|---|---|---|---|---|
| Demineralized water | 289 | 289 | 76 | 289 | 169 |
| PCC slurry from the invention | 0 | 0 | 263 | 0 | 170 |
| Dry PCC from the invention | 0 | 50 | 0 | 50 | 0 |

-continued

|  | Formulation 1 (wt %) | Formulation 2 (wt %) | Formulation 3 (wt %) | Formulation 4 (wt %) | Formulation 5 (wt %) |
|---|---|---|---|---|---|
| Rheological additive (cellulose) | 0.3 | 0.3 | 0.3 | 0.3 | 0.3 |
| Ammonia | 0.1 | 0.1 | 0.1 | 0.1 | 0.1 |
| Dispersing agent | 0.8 | 0.8 | 0.8 | 0.8 | 0.8 |
| Defoamer | 0.2 | 0.2 | 0.2 | 0.2 | 0.2 |
| TiO2 | 12.5 | 7.5 | 7.5 | 7.5 | 7.5 |
| Socal P2 (PCC) | 5.0 | 5.0 | 5.0 | 5.0 | 5.0 |
| *GCC | 41.0 | 41.0 | 41.0 | 41.0 | 41.0 |
| Biocide | 0.2 | 0.2 | 0.2 | 0.2 | 0.2 |
| Binder | 11.0 | 11.0 | 11.0 | 11.0 | 11.0 |

*GCC is ground calcium carbonate

Cellulose is added to the water with stirring. Ammonia is added and the mixture was stirred again and then allowed to swell for approximately 20 minutes with repeated stirring. The wetting agent, the dispersing agent and the defoamer are then added, followed by GCC, PCC and $TiO_2$. The composition is transferred into a dissolver and is dispersed during approximately 5 minutes at 2500±500 Rpm, then the binder and the biocide are added and the mixture is further dispersed for approximately 2 minutes at 2000±500 Rpm. The paint is allowed to stand for one day at room temperature before testing.

The resulting aqueous emulsion paints are characterized as follows, according to EN-13300 standards.

Example 1

Preparation of a Dry PCC from a Milk of Lime Presenting a Concentration of 15 wt. %

CaO is reacted with water such that dry $Ca(OH)_2$ is obtained. The reaction is controlled such that 1 molar equivalent of water is reacted per one molar equivalent of CaO and the water content of the dry $Ca(OH)_2$ is less than 2%. The dry $Ca(OH)_2$ is contacted with water to provide a milk of lime. $CO_2$ is bubbled into a milk of lime presenting a solid concentration of 15 wt. % in the presence of a crystallization controller consisting of a mixture of polyacrylic acid and sodium polyacrylate. The resulting PCC slurry presents a concentration of 19 wt. % and is then filtered, dried and milled to obtain a dry PCC (Formulation 2). The PCC contains nanochain like agglomerates, combined to form microshell like aggregates.

Example 2

Preparation of a PCC Slurry from a Milk of Lime Presenting a Concentration of 15 wt. %

$CO_2$ is bubbled into a milk of lime presenting a solid concentration of 15 wt. % in the presence of a crystallization controller consisting of a mixture of polyacrylic acid and sodium polyacrylate. The resulting PCC slurry presents a concentration of 19 wt. % (Formulation 3). The analysis of the PCC particles recovered from the slurry shows a morphology of nanochain like agglomerates, combined to form microshell like aggregates.

Example 3

Tests in Paints of the PCC Prepared in the Example 1 and 2

|  | Formulation 1 | Formulation 2 | Formulation 3 |
|---|---|---|---|
| Optical data dry, Datacolor 600 |  |  |  |
| Brightness/Y (%) | 92.2 | 92.7 | 92.6 |
| Opacity 200 µm (%) | 98.67 | 98.45 | 98.61 |
| Yellowness DIN 6167 | 2.6 | 2.3 | 2.3 |
| Gloss 85° | 3.9 | 5.1 | 4.9 |

The obtained results show that it is possible to substitute up to 40% of $TiO_2$ while keeping an opacity close to the reference one. Opacity of the slurry is similar to the slurry one.

Example 4

Preparation of a Dry PCC from a Milk of Lime Presenting a Concentration of 26 wt. %

$CO_2$ is bubbled into a milk of lime presenting a solid concentration of 26 wt. % in the presence of a crystallization controller consisting of a mixture of polyacrylic acid and sodium polyacrylate. The resulting PCC slurry presents a concentration of 30 wt. % and is then filtered, dried and milled to obtain a dry PCC (Formulation 4). The analysis of the PCC particles recovered from the slurry shows a morphology of nanochain like agglomerates, combined to form microshell like aggregates.

Example 5

Preparation of a PCC Slurry from a Milk of Lime Presenting a Concentration of 26 wt. %

$CO_2$ is bubbled into a milk of lime presenting a solid concentration of 26 wt. % in the presence of a crystallization controller consisting of a mixture of polyacrylic acid and sodium polyacrylate. The resulting PCC slurry presents a concentration of 30 wt. % (Formulation 6). The analysis of the PCC particles recovered from the slurry shows a morphology of nanochain like agglomerates, combined to form microshell like aggregates.

Example 6

Tests in Paints of the PCC Prepared in the Example 4 and 5

|  | Formulation 1 | Formulation 4 | Formulation 6 |
|---|---|---|---|
| Optical data dry, Datacolor 600 |  |  |  |
| Brightness/Y (%) | 92.2 | 92.5 | 91.2 |
| Opacity 200 µm (%) | 98.67 | 98.46 | 98.41 |
| Yellowness DIN 6167 | 2.6 | 2.3 | 2.5 |
| Gloss 85° | 3.9 | 5.1 | 4.6 |

The obtained results show that it is possible to substitute up to 40% of $TiO_2$ while keeping an opacity close to the reference one. Opacity of the slurry is similar to the slurry one.

The invention claimed is:

1. A precipitated calcium carbonate comprising scalenohedron particles and
   particles which are at least partially in the form of nanofibers or nanochain like agglomerates constituted by at least two interconnected primary particles, wherein
   at least a part of the scalenohedron particles and the nanofibers or nanochain like agglomerates form microshells.

2. The precipitated calcium carbonate according to claim 1 wherein the primary particle size of the nanofibers or nanochain like agglomerates is from 50 to 200 nm.

3. The precipitated calcium carbonate according to claim 1 wherein the average length of the scalenohedron particles is in a range of from 250 to 500 nm.

4. The precipitated calcium carbonate according to claim 1, wherein the precipitated calcium carbonate particles comprise a crystallization controller.

5. The precipitated calcium carbonate according to claim 3, wherein the crystallization controller has an average molecular weight from 500 to 15000 g/mol.

6. The precipitated calcium carbonate according to claim 1, wherein the nanofibers or nanochain like agglomerates have an average diameter from 50 to 200 nm, and wherein the nanofibers or nanochain like agglomerates have an average length from 80 to 1000 nm.

7. The precipitated calcium carbonate according to claim 1, wherein the nanofibers or nanochain like agglomerates are at least partially combined in the form of microshell like aggregates.

8. The precipitated calcium carbonate according to claim 1 wherein the precipitated calcium carbonate is in the form of an aqueous slurry.

9. The precipitated calcium carbonate in the form of an aqueous slurry according to claim 8 which comprises 19 to 60% by weight of the precipitated calcium carbonate.

10. The precipitated calcium carbonate of claim 8, obtained by
    a) reacting CaO with water to form $Ca(OH)_2$,
    a1) drying the $Ca(OH)_2$ of step a) to provide dry $Ca(OH)_2$;
    b) contacting the dry $Ca(OH)_2$ with water to form a slurry; and
    c) carbonating the slurry of $Ca(OH)_2$ from step b) with $CO_2$.

11. A process for the manufacture of precipitated calcium carbonate which is suitable as opacifier, which process comprises
    a) reacting CaO with water to form dry $Ca(OH)_2$,
    b) contacting the dry $Ca(OH)_2$ of step a) with water to form a slurry; and
    c) carbonating the slurry of $Ca(OH)_2$ from step b) with $CO_2$ to form scalenohedron particles.

12. The process of claim 11, wherein step a) comprises drying the $Ca(OH)_2$ to provide dry $Ca(OH)_2$.

13. A method for the manufacture of paint, plastics, paper, plastisol, sealant or ink wherein the precipitated calcium carbonate of claim 1 is applied in a production plant to provide precipitated calcium carbonate as filler.

14. The method of claim 13 wherein the precipitated calcium carbonate, in the form of a slurry, is applied in a production planter for the manufacture of paint, plastics, paper, or ink.

15. The method of claim 14 wherein the slurry is produced on site of the production plant.

16. The method of claim 13 comprising a step of drying the slurry to provide dry precipitated calcium carbonate which is then applied for the manufacture of plastisols, sealants or polymers.

17. The method of claim 13 wherein the paint, plastics, paper, plastisol, sealant or ink do not contain any $TiO_2$ filler.

18. The method of claim 13 wherein the plastics are polyethylene plastics.

* * * * *